(12) United States Patent
Bacon

(10) Patent No.: US 6,725,994 B2
(45) Date of Patent: Apr. 27, 2004

(54) MECHANISM USEFUL AS A SLIP CLUTCH OR BRAKE AND METHOD OF MAKING SAME

(75) Inventor: Philip H. Bacon, Handen, CT (US)

(73) Assignee: Custom Products Corporation, North Haven, CT (US)

( * ) Notice: Subject to any disclaimer, the term of this patent is extended or adjusted under 35 U.S.C. 154(b) by 0 days.

(21) Appl. No.: 09/947,003

(22) Filed: Sep. 5, 2001

(65) Prior Publication Data

US 2003/0042109 A1 Mar. 6, 2003

(51) Int. Cl.⁷ .................... E05D 11/08; E05C 17/64
(52) U.S. Cl. .................... 192/223; 16/342; 74/531; 192/56.1; 464/30
(58) Field of Search .................... 192/223, 223.4, 192/56.1, 56.2; 74/531; 188/77 R, 82.6, 134; 16/342; 464/40, 30

(56) References Cited

U.S. PATENT DOCUMENTS

| | | | |
|---|---|---|---|
| 1,615,804 A | | 1/1927 | Starkey |
| 1,804,457 A | * | 5/1931 | Briggs ..................... 192/223.4 |
| 1,867,643 A | * | 7/1932 | Ackerman et al. ....... 192/223.4 |
| 1,965,878 A | * | 7/1934 | Briggs ..................... 192/223.4 |
| 1,997,646 A | * | 4/1935 | Miller ..................... 192/223.4 |
| 2,459,972 A | | 1/1949 | Starkey |
| 2,541,947 A | | 2/1951 | Starkey |
| 2,598,993 A | * | 6/1952 | Gorske ..................... 192/223.4 |
| 2,784,810 A | * | 3/1957 | Ulmann ..................... 188/82.6 |
| 3,110,380 A | * | 11/1963 | Meyer et al. ............. 188/82.6 |
| 3,307,663 A | * | 3/1967 | Luenberger ................ 188/134 |
| 3,335,454 A | | 8/1967 | Dunster |
| 3,851,499 A | * | 12/1974 | Noguchi ..................... 464/30 |
| 3,893,554 A | | 7/1975 | Wason |
| 3,930,566 A | * | 1/1976 | Matsushima ............. 192/223.4 |
| 4,194,605 A | | 3/1980 | Sessa |
| 4,459,121 A | * | 7/1984 | Gazzera et al. ............... 464/30 |
| 4,651,854 A | * | 3/1987 | Harada ..................... 192/223.4 |
| 4,854,189 A | * | 8/1989 | Ulbing ..................... 464/160 |
| 5,234,089 A | | 8/1993 | Itomi et al. |

FOREIGN PATENT DOCUMENTS

EP  0 002 631 A1 * 6/1976

\* cited by examiner

Primary Examiner—Rodney H Bonck
(74) Attorney, Agent, or Firm—Cantor Colburn LLP

(57) ABSTRACT

A mechanism useful as a slip clutch or brake, including a first member having a cylindrical inner wall, a second generally cylindrical member received coaxial within the first member so as to be rotatable therein, and at least one generally annular third spring member between the first and second members, the at least one third member having an external surface in contact with the inner wall of the first member, the second member having at least one longitudinal recess defining two wall surfaces, the at least one third member having ends extending inwardly into the at least one recess, each of the ends of the at least one third member contacting the wall surfaces.

36 Claims, 4 Drawing Sheets

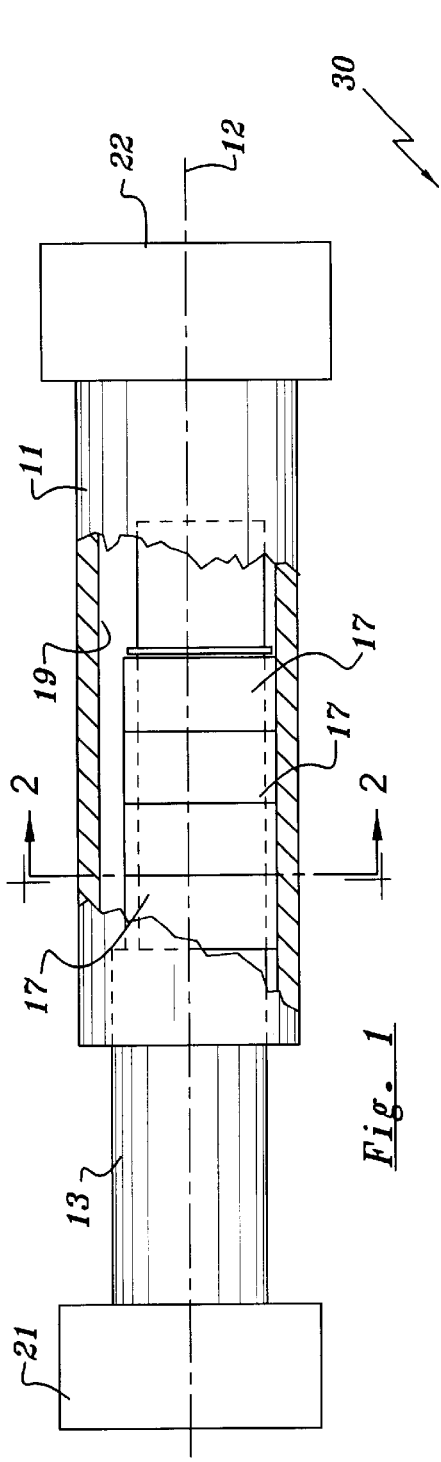
Fig. 1
Fig. 2
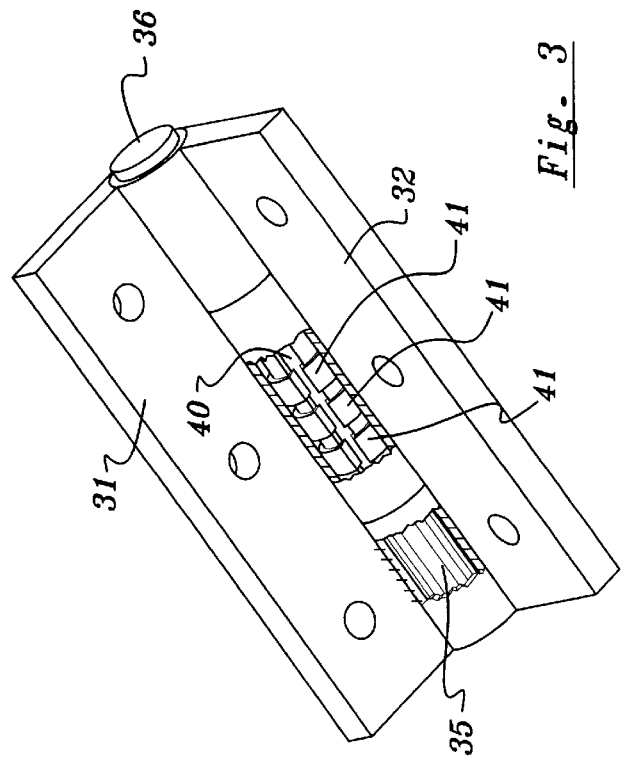
Fig. 3
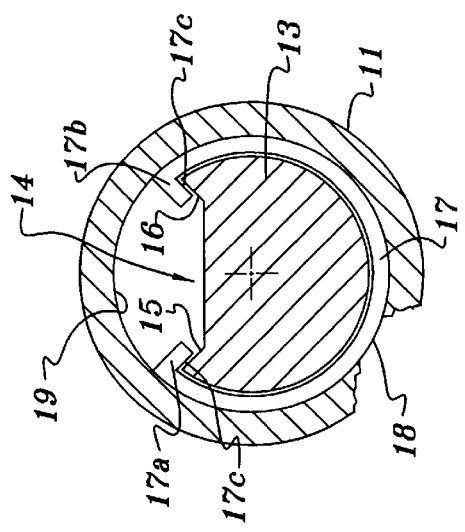

MECHANISM USEFUL AS A SLIP CLUTCH OR BRAKE AND METHOD OF MAKING SAME

FIELD OF THE INVENTION

This invention relates to a mechanism, which is useful as a slip clutch sometimes-termed torque limiters, and also useful as a holding device or brake and a method of making the same.

BACKGROUND OF THE INVENTION

Slip clutch mechanisms of various constructions are used in many applications to couple a driving shaft to a driven shaft or other device, and to limit the transmitted torque. They may also be used in or as hinges to hold one device in a predetermined angular position with respect to another device, for example, the lid of a case for a laptop computer. In the latter type of uses the slip clutches provide the function of brakes.

The prior art discloses many different slip clutch constructions using various spring arrangements to establish a slip torque between a driving and driven member to thereby limit the torque transmitted.

Some of these prior art devices are relatively complicated, requiring a large number of parts and helical springs and most are limited in the slip torque range they can provide. Also, there is a constant demand of organizations using small slip clutches for a more economical device.

The present invention provides a new and improved slip clutch construction which uses a minimal number of different parts, which construction permits a wide range of slip torques and which is simplified in manufacture. The invention also provides a slip clutch having the above characteristics which is bi-directional in operation.

An object of this invention is to provide a new and improved mechanism for slip clutch or brake design and construction and which permits a wide range of slip torques for a given size clutch and a wide range of holding forces when used as a brake.

Another object of this invention is to provide a new and improved mechanism for a slip clutch with a more easily controllable and repeatable slip torque, which is less susceptible to wear.

Another object of this invention is to provide a new and improved slip clutch, which utilizes a minimum number of different parts and is easy to assemble.

A further object of this invention is to provide a new and improved method of making a mechanism of the type described having the foregoing characteristics.

A still further object of this invention is to provide a new and improved mechanism of the type described which provides a wide range of design choices and method of making the same.

SUMMARY OF THE INVENTION

Briefly stated, the invention, in one form thereof, comprises a slip clutch which comprises only three different components, a first hollow cylindrical member having an inner wall, a second generally cylindrical member received coaxial within the first member and at least one third member between the first and second members and having frictional engagement with the inner wall of the first member. The second member has a longitudinal recess in the form of a flat or defined by angularly spaced apart walls on radii from the longitudinal axis of the second member The at least one third member is generally annular has its ends bent inwardly and forming arms extending into the recess and arranged to be contacted by or contact one of the recess defining walls. Upon rotation of the first member as a driving member, the second member is driven through the frictional contact of the third member with the inner wall and the arms of the at least one third member acting on the recess defining walls. When the second member is rotated as a driving member, a recess-defining wall contacts an arm of the third member and drives the first member through the frictional contact of the third member therewith.

The invention is particularly pointed out and distinctly claimed in the concluding portion of this specification. The invention, however, together with further objects and advantages thereof may be best appreciated by reference to the following detailed description taken in conjunction with the drawings.

BRIEF DESCRIPTION OF THE DRAWINGS

FIG. 1 is a side view of a slip clutch embodying the invention with a portion thereof cut away;

FIG. 2 is an enlarged sectional view, with a portion of seen in the plane of lines 2—2 of FIG. 1;

FIG. 3 is an isometric view, partially cut away, of another embodiment of the invention as utilized as a brake in a hinge;

DETAILED DESCRIPTION OF PREFERRED EMBODIMENTS OF THE INVENTION

Figure 4:
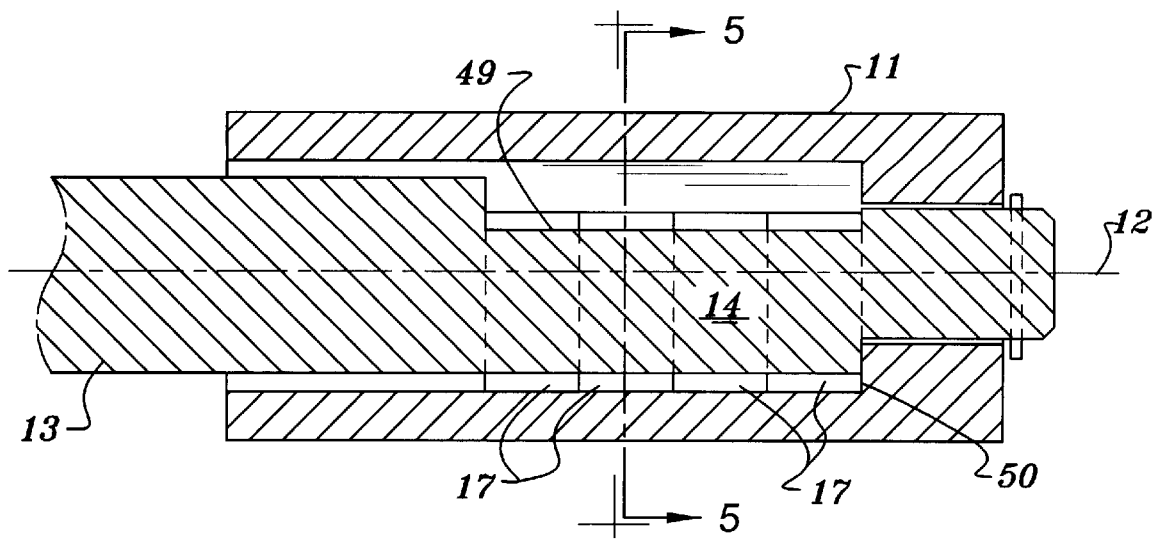
FIG. 4 is a longitudinal half section, partially cut away, of another embodiment of the invention.

Mechanisms embodying the invention may be utilized as torque limiting slip clutches or as a brake or holding device, as previously pointed out. However, for purposes of disclosure, the mechanism will primarily referred to as a slip clutch Reference is made to FIGS. 1 and 2. A slip clutch 10 embodying the invention comprises a first member 11 of hollow cylindrical form defined about a longitudinal axis 12. Essentially coaxially received within member 11 is a second member 13, which as shown in FIG. 2 has a longitudinal recess 14 therein defined by walls 15 and 16. Walls 15 and 16 are defined on radii emanating from the axis of member 11, which is essentially coincident with the longitudinal axis 12 of member 13. A plurality of third members 17 (four shown in FIG. 1) are disposed between members 11 and 13 having outer surfaces 18 in frictional contact with the inner wall 19 of member 11. Members 17 are springs, which tend to expand outwardly. Each of members 17 has an end portion bent over into arms 17a and 17b. Arms 17a and 17b are formed on angles so that the inside 17c of the arms are essentially parallel to a contacting wall surface 15 and 16 and will be in essentially full surface contact therewith.

To facilitate assembly, as hereinafter described, the recess 14 is continued to the end of second member 13 (right end as shown in FIG. 1). The preformed spring member 17 are slid over the recessed end of second member 13 until the first contacts the end of recess 14 and the desired number are in position. An annular slot is defined in member 13 to receive a snap ring 20, which prevents longitudinal movement of members 17 along member 13.

The slip torque of a slip clutch embodying the invention will depend on the geometry of the member 17, i.e. the surface area in contact with the inner wall 19 of member 11 and the number of members 17 which are used in a slip clutch, The slip torque will also depend on the coefficient of friction between the member(s) 17 and the inner wall of member 11. The member(s) 17 are springs and will tend to expand outwardly. Therefore, another factor will be the tension in member 17 when it is formed and inserted into member 11 and expands against wall 19. This will depend on the spring constant of the material of member(s) 17.

The spring members 17 are of rectangular cross-section and provide a flat outer surface to contact the inner wall of member 11. Thus the contact area of any number of elements 17 may be readily determined for a given size slip clutch or brake. This lends great versatility to prediction of slip torques and holding power.

The angle between surfaces 17c is selected to be one hundred eighty degrees or less. This is a matter of design taking into consideration the area of contact of a member(s) 17, the cost of defining the recess and other manufacturing considerations In FIG. 1, the second member 13 is exemplified as the driving member and is adapted to receive a coupling 21, shown in block form, for connection to a driving source. Similarly, first member 11, as the driven member is adapted to receive a coupling 22, again shown in block form, to an object to be rotatably driven.

The invention may also be used as a brake, as exemplified in a hinge 30, shown in FIG. 3. The hinge 30 of FIG. 3 comprises leaves 31 and 32. Leaf 31 includes two spaced apart curls 33 and 34 defining a passage 35 therethrough for a hinge pin 36 having a head 37. Leaf 32 has a curl 38 with a passage 39 therethough aligned with passages 35 and also receives hinge pin 36 therethrough.

Hinge pin 36 has a longitudinal recess 40 formed therein, as shown in FIG. 2. A plurality of friction spring members 41 are disposed about hinge pin 36 and have arms at the free ends thereof as exemplified by the arms 17a and 17b in FIG. 2, extending into recess 40 and arranged to be engaged by radial walls defining recess 40, again as shown in FIG. 2.

Figure 5:
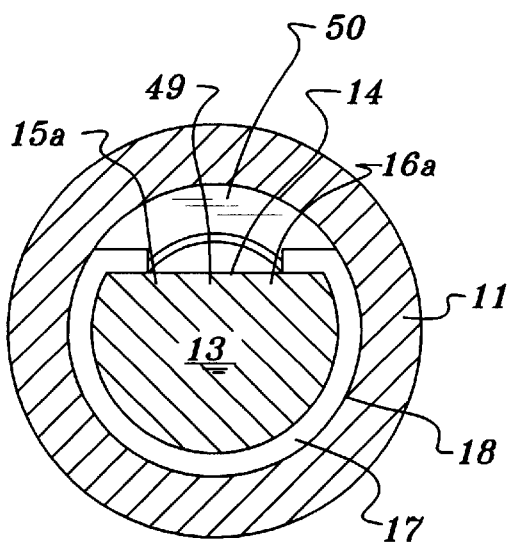
FIG. 5 is a sectional view seen in the plane of lines 5—5 of FIG. 4.

The invention as shown in FIG. 3 acts as a brake to set and hold the angular position of one member with respect to another. An example is the lid of a carrying case for a lap top computer. In such application the friction between the inner wall of curl 38 and the friction spring elements 41 will hold the lid in any open position. The friction element 17 are shown as spaced apart in FIG. 3 for clarity of illustration Another embodiment of the invention is shown in FIGS. 4 and 5 where like reference numerals as used in FIGS. 1 and 2 identify like or equivalent elements. In the embodiment of FIGS. 4 and 5, recess 14 is defined by removal of a longitudinal section of member 13 to provide a recess 14 defined by two walls 15a and 16a in the same chordal plane, indicated by the reference numeral 49. The wall indicated by the reference numeral 49 is actually a plane in which both of walls 15a and 16a reside. The wall 49 is referred to as a chordal plane inasmuch as it forms a chord of the circular cross section of member 13. Member 11 has a counter bore which defines a small wall or shoulder 50, which acts as a retainer for the spring friction members 17. Also, an annular groove is defined in member 13, receiving a snap-ring 51, which serves as a retainer for the spring friction members 17, if the counter bore defining shoulder 50 is not provided. These two longitudinal retaining arrangements for the frictional elements 17 are in the alternative/

The operation of the embodiment of FIGS. 4 and 5 is the same as that described for the embodiment of FIGS. 1 and 2.

Figure 6:
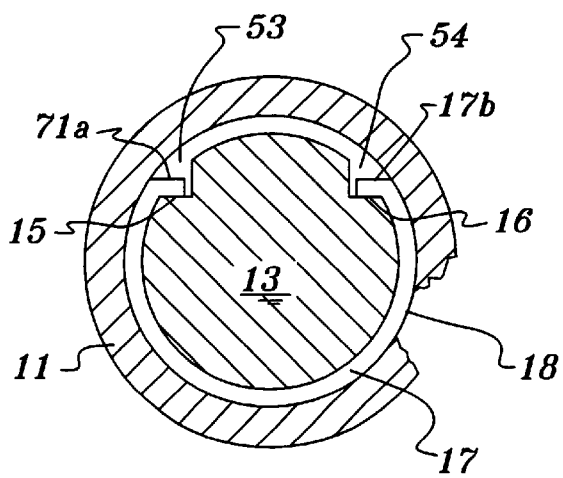
FIG. 6 is a sectional view, similar to FIG. 2 illustrating another embodiment of the invention.
Figure 7:
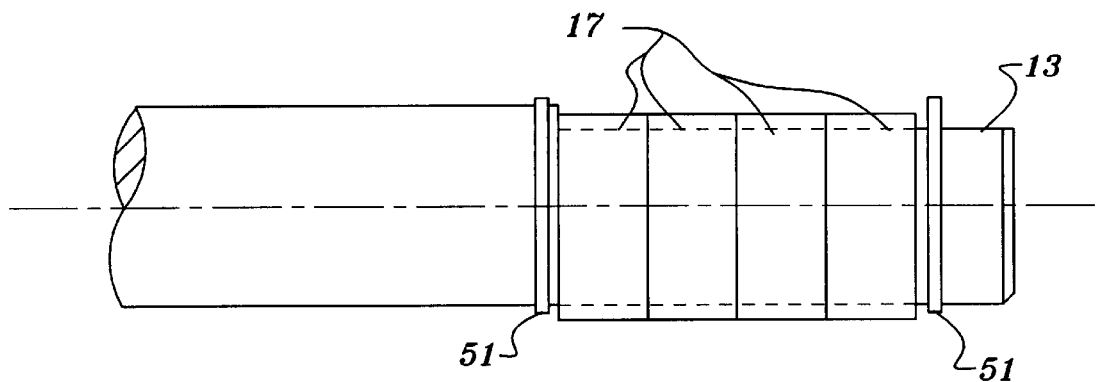
FIGS. 7, 8, 9 and 10 are side views of alternate embodiments of components of the invention.

The invention may be practiced in many different forms. FIG. 6 illustrates a cross section through a slip clutch where the second or driving member 13 has two longitudinal recesses 53 and 54 defined therein, to further define walls or surfaces 15 and 16. Upon rotation of member 13, one of arms 17a or 17b will be engaged and rotate members 17 therewith, which in turn frictionally engage inner wall 19 of member 11 and drive member 11. Additional recesses 53 and 54 may be defined in the lower portion of member 13 of FIG. 6 in order that the elements 17 may be positioned on member 13 in alternate opposite orientations as hereinafter exemplified in another embodiment of the invention.

Figure 8:
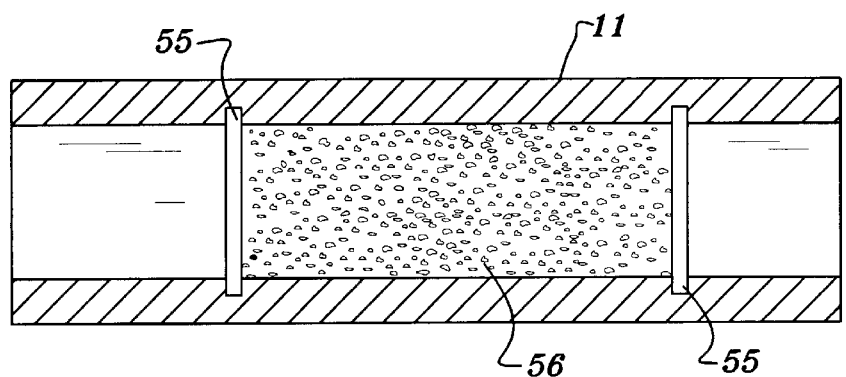

An embodiment of the invention similar to FIGS. 4 and 5 may be utilized where the spring elements are longitudinally retained on second member 13 by snap rings 51 in annular grooves on either side of elements 17. Conversely the retaining snap rings 51 may be inserted in annular grooves 55 defined in member 11 as shown in FIG. 8. FIG. 8 also illustrates a coating 51a of friction material such as nylon on the inner wall of member 11.

Figure 9:
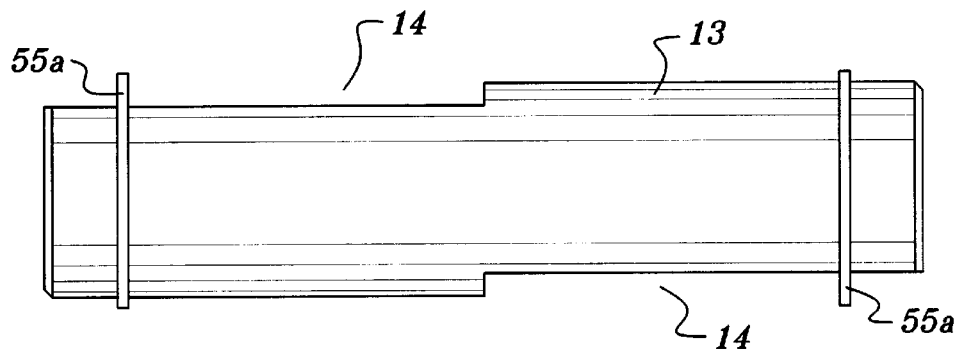

In some instances, it may be desirable to provide recesses 14 on opposite sides of the second member 13 for receipt of the spring elements 17, as shown in FIG. 9. This arrangement will serve to balance the loading on the first and second members if a large number of spring elements are used.

Figure 10:
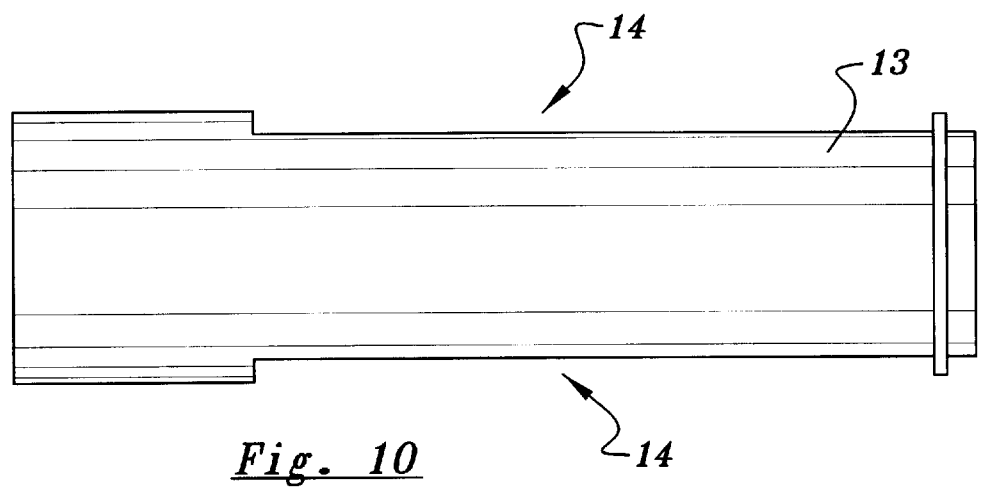

FIG. 10 illustrates another embodiment for serving the same purpose. Here, two recesses 14 are on diametrically opposite sides and in parallel planes of the second member 13. The spring members 17 are alternated in orientation. This serves to balance the load, eliminating any tendency for the driving second member 13 to move out of concentricity with the first or driven member 11.

Figure 11:
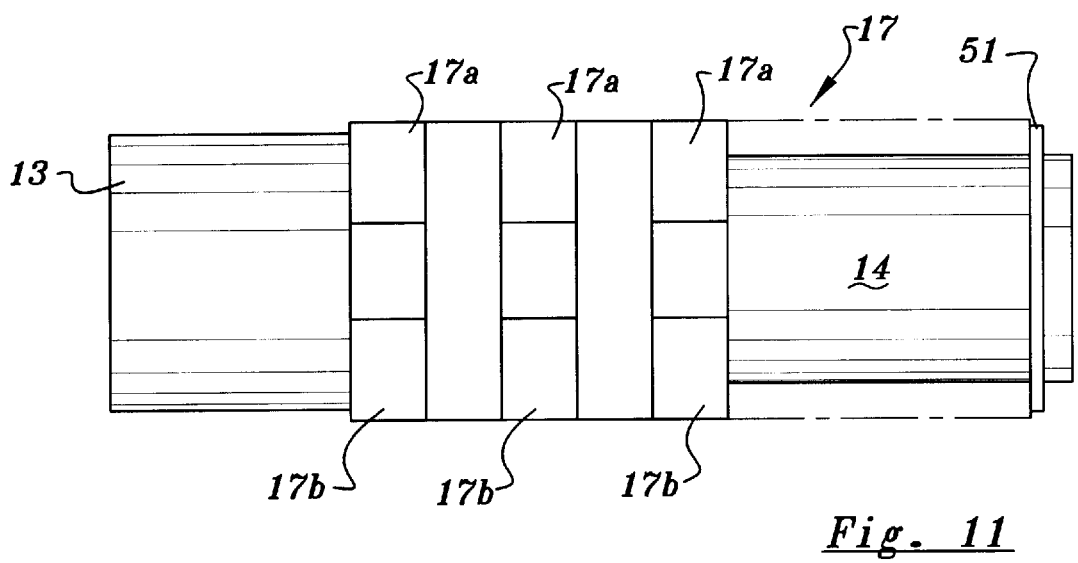
FIG. 11 is a top view of the component of FIG. 10 with friction elements thereon.

FIG. 11, which is a top view of FIG. 10, illustrates the embodiment of FIG. 10 with a plurality of elements 17 thereon in alternate opposite orientation. In FIG. 11, the bent over arms 17a and 17b alternate elements 17 may be seen. The elements extend in alternate opposite orientation along the length of recesses 14 to the means for limiting any longitudinal movement thereof, snap ring 51.

Figure 12:
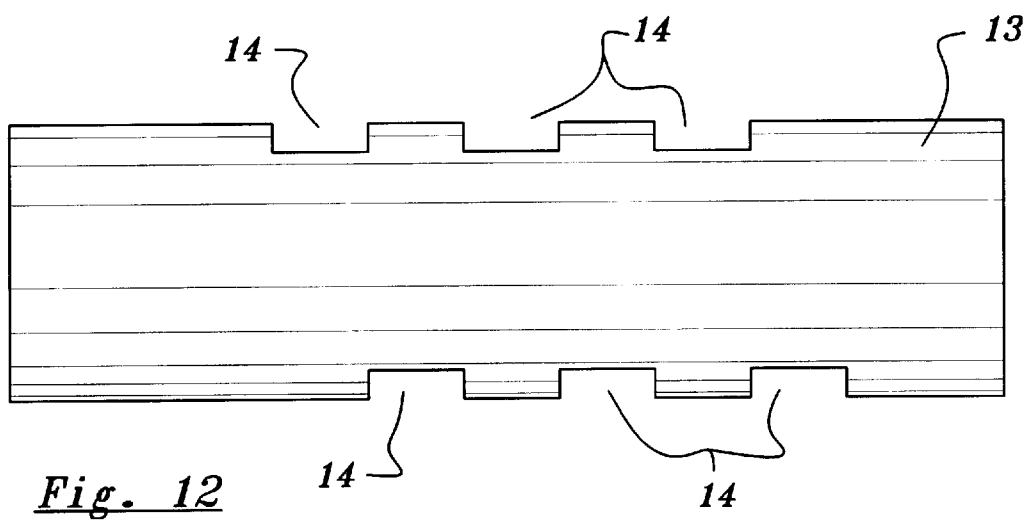
FIG. 12 is a side view of another embodiment of a component of the invention.

A further, similar alternative is to alternate recesses 14 on either side of member 13 along the length thereof to receive successive spring elements 17 of alternate orientation. A second member 13 of such construction is shown in FIG. 12.

The recesses 14 may take any form so long as the recesses are so defined as to provide surfaces for contact by the arms 17a and 17b of elements 17. The recesses may be defined by walls on a radius to the axis of member 13 as shown in FIGS. 1 and 2, by longitudinal notches as shown in FIG. 6 or by a chordal wall as shown in FIGS. 4 and 5. In any of these constructions It may be seen that the invention may be embodied in many different forms of construction.

There is a wide choice in the selection of materials for the various members. The driving member may be of any material, such as steel, that will carry the torque without undue flexing or wear. The spring elements 17 will usually be of a spring steel, but may be of another metal or even plastic. The first member may be metal or plastic. The selection of materials will depend on the combination of slip characteristics, required life and any other specified characteristics. If a friction coating is utilized it may most easily be applied to the inner surface of the first member, however, a friction coating may be applied to the outside surface 18 of the spring elements.

The number of spring elements that will contact the inside surface of the first member, as well as the area of contact and the friction therebetween determines the slip torque, or in the case of a brake, the holding force.

The spacing between the second member 13 and the inside wall 19 of the first member 11 is made as small as possible to minimize backlash when the clutch is operated in a bi-directional environment.

A mechanism embodying the invention is easily manufactured and assembled. A first member is provided, which may be counter bored to provide a shoulder 50, as shown in FIG. 4. A second member 13 is provided with a recess 14 defined thereon, preformed friction spring elements 17 are positioned on the second member 13 by sliding the elements 17 on member 13 at the recessed end as explained in conjunction with the description of FIGS. 4 and 5. If the first member is not counter bored to provide a retaining shoulder 50 as shown in FIG. 4, Prior to assembly, any necessary annular grooves are defined in member 11 or member 13 to receive retaining snap rings 51. With the elements 17 on member 13, member 13 is then inserted into member 11 and the couplings 21 and 22 applied.

If the recesses 14 are not carried out to an end of member 13, the spring elements 17 will be expanded and positioned with their arms 17a and 17b on the surfaces defining recess 14. This method of assembly may be used only when the spring constant and physical characteristics of the spring element permits such expansion with recovery to the specified shape and size.

It may thus be seen that the objects of the invention set forth above as well as those made apparent are efficiently attained. While preferred embodiments of the invention have been set forth for purposes of disclosure, modifications to the disclosed embodiments as well as other embodiments of the invention may occur to those skilled in the art. Accordingly, the appended claims are intended to cover all modifications to the disclosed embodiments of the invention as well as other embodiments thereof which do not depart from the spirit and scope of the invention.

What is claimed is:

1. A mechanism useful as a slip clutch or brake, comprising:
   a first member having a cylindrical inner wall;
   a second generally cylindrical member received coaxial within said first member so as to be rotatable therein; and
   at least one generally annular third spring member between said first and second members;
   said at least one third member having an external surface in contact with said inner wall of said first member, said second member having at least one longitudinal recess defining two wall surfaces, said at least one third member having ends extending inwardly into said at least one recess, each of said ends of said at least one third member contacting said wall surfaces.

2. The mechanism of claim 1 wherein the at least one longitudinal recess on said second member extends to an end of said second member to permit said at least one third member to be slid on said second member with the ends of said at least one third member in said recess.

3. The mechanism of claim 1 wherein said ends of said at least one third member are so angled as to have essentially full surface contact with said wall surfaces.

4. The mechanism of claim 1 wherein said wall surfaces are in a common plane.

5. The mechanism of claim 1 where said wall surfaces are at an angle of one hundred eighty degrees or less from each other.

6. The mechanism of claim 5 where said wall surfaces are defined on radii from the longitudinal axis of said second member.

7. The mechanism of claim 1 wherein a plurality of third members are on said second member and retaining means are disposed in one of said first and second members to prevent longitudinal displacement of said third members.

8. The mechanism of claim 1 wherein retaining means are disposed on one of said first and second members to prevent longitudinal displacement of said at least one third member.

9. The mechanism of claim 1 wherein said first member has an internal annular shoulder to prevent longitudinal displacement of said third member in a first direction and retaining means are disposed on one of said first and second members to prevent longitudinal movement of said third members in the other direction.

10. The mechanism of claim 1 wherein two longitudinal recesses are defined on opposite sides of said second member for receipt of oppositely disposed third members.

11. The mechanism of claim 10 wherein said recesses are on diametrically opposite sides of said second member in parallel planes and a plurality of said third members are alternately oppositely disposed on said second member.

12. The mechanism of claim 1 wherein said inner wall of said first member has a coating of friction material thereon.

13. The mechanism of claim 1 including a plurality of said third members and said inner wall of said first member is counter bored to provide a shoulder which prevents longitudinal movement of said third members on said second member.

14. The mechanism of claim 1 wherein said at least one third member is of a spring material which expands into engagement with said inner wall of said first member.

15. The mechanism of claim 1 wherein two longitudinal recesses are defined on opposite sides of said second member to receive plurality of oppositely oriented third members.

16. The mechanism of claim 1 wherein said second member is the driving member.

17. The mechanism of claim 1 wherein said first member is the driving member.

18. The mechanism of claim 1 wherein a plurality of recesses are defined in said second member longitudinally along the length of said second member, said recesses being defined in alternating opposite sides of said second member to receive successive third members of opposite orientation.

19. The mechanism of claim 1 wherein the at least one longitudinal recess on said second member extends to an end of said second member to permit said at least one third member to be slid on said second member with the ends of said at least one third member in said recess.

20. The mechanism of claim 19 wherein two longitudinal recesses are defined on opposite sides of said second member for receipt of oppositely disposed third members.

21. The mechanism of claim 19 wherein said recesses are on diametrically opposite sides of said second member in parallel planes and a plurality of said third members are alternately oppositely disposed on said second member.

22. The mechanism of claim 19 wherein two longitudinal recesses are defined on opposite sides of said second member to receive a plurality of alternate oppositely oriented third members.

23. The mechanism of claim 1 wherein retaining means are disposed in one of said first and second members to prevent longitudinal displacement of said third members.

24. The mechanism of claim 1 wherein said third member is of a spring material which expands into engagement with said inner wall of said first member.

25. A mechanism useful as a slip clutch or brake comprising:
  a first member having a cylindrical inner wall;
  a second generally cylindrical member received coaxial within said first member so as to be rotatable therein; and
  a plurality of generally annular third spring members between said first and second members;
  said third members having a rectangular cross section and an external surface in contact with said inner wall of said first member, said second member having at least one longitudinal recess defining two wall surfaces, said third members having ends extending inwardly into said recess, each of said ends of said third members contacting said wall surfaces.

26. The mechanism of claim 25 wherein said ends of said third member are so angled as to have essentially full surface contact with said wall surfaces.

27. The mechanism of claim 25 wherein said wall surfaces are in a common plane.

28. The mechanism of claim 25 where said wall surfaces are at an angle of one hundred eighty degrees or less from each other.

29. The mechanism of claim 25 where said wall surfaces are defined on radii from the longitudinal axis of said second member.

30. The mechanism of claim 25 wherein retaining means are disposed on one of said first and second members to prevent longitudinal displacement of said third members.

31. The mechanism of claim 25 wherein said first member has an internal annular shoulder to prevent longitudinal displacement of said third members in a first direction and retaining means are disposed on one of said first and second members to prevent longitudinal movement of said third members in the other direction.

32. The mechanism of claim 25 wherein said inner wall of said first member has a coating of friction material thereon.

33. The mechanism of claim 25 wherein a plurality of recesses are defined in said second member longitudinally along the length of said second member, said recesses being defined in alternating opposite sides of said second member to receive successive third members of opposite orientation.

34. A method of making a mechanism useful as a slip clutch or brake comprising the steps of:
  providing a first member having a cylindrical inner surface,
  providing a second member having a generally cylindrical outer surface,
  defining a longitudinal recess in said second member extending to an end thereof, said recess being defined by walls spanning one hundred, eighty degrees or less,
  providing at least one generally annular friction spring element of generally rectangular cross section having ends bent inwardly so as to be essentially in full surface contact with said recess defining walls and positioning said at least one element on said second member in said recess, and
  inserting said second member with said at least one element thereon within said first member with said element in surface engagement with the inner wall of said first member.

35. The method of claim 34 wherein a plurality of said elements are positioned on said second member.

36. The method of claim 34 wherein said step of defining a recess includes defining a recess on opposite sides of said second member and positioning third elements on said second member in alternately opposite orientations.

* * * * *